L. E. WATERMAN.
LAND ROLLER.
APPLICATION FILED DEC. 19, 1911.
1,064,265.
Patented June 10, 1913.
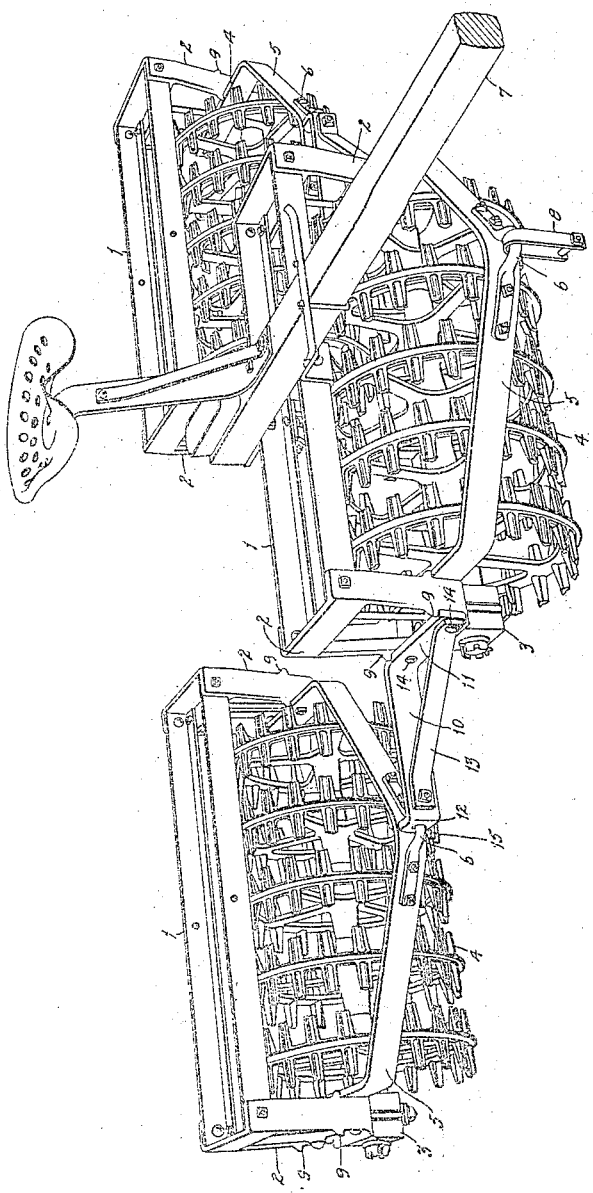

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

LAND-ROLLER.

1,064,265.　　　　Specification of Letters Patent.　　Patented June 10, 1913.

Application filed December 19, 1911. Serial No. 666,859.

*To all whom it may concern:*

Be it known that I, LEWIS E. WATERMAN, a citizen of the United States, residing at Rockford, in the county of Winnebago and State of Illinois, have invented certain new and useful Improvements in Land-Rollers, of which the following is a specification.

The object of this invention is to connect a plurality of sections by the employment of end brackets removably connected to the forward section.

In the accompanying drawings is shown a perspective view of a three section land roller containing my improvements. The three sections are of like construction, and each comprising the upper frame 1 to which are connected depending ends 2 formed with boxes 3 which support a roller 4. The depending ends have a bail 5 connected therewith and extend forward therefrom. To the bail is connected a loop 6. A tongue 7 is connected to the frame of the forward section and a seat is supported by the tongue. A draft link 8 is connected to the loop of the forward section. The lower end of each of the depending ends 2 is formed with lugs 9.

A bracket comprises the main branch 10 having a right-angled section 11 and a right-angled end 12. A brace bar 13 has one end bolted to the main section 10. Bolts 14 connect the bracket to the depending ends 2 of the forward section. The end 12 of the bracket is formed with an opening 15 through which the yoke 6 is passed before being secured to the bail 5. There are two of these brackets, one connected to each of the depending ends 2 of the forward section, and each bracket has a rear section connected to it.

By the employment of brackets of different lengths different lengths of rear sections can be employed so that any width of roller can be connected, and the brackets can be detached from the front sections when a single section roller is desired.

I claim as my invention:

1. A land roller comprising a forward section and rear sections, said sections comprising a roller, a frame whose sides form a journal-bearing for the roller, lugs formed on each side of the side frame, bails held to the inner side of the side frame by the lugs, and detachable brackets held to the outer sides of the front side section by the lugs and having a connection with the bails of the rear sections.

2. A land roller comprising a forward section and two rear sections, each having a frame the sides of which are journaled to its roller, and a bail secured to the frame; and a detachable bracket secured to each of the ends of the forward section, said brackets having outstanding arms adapted to form a pivotal connection with the two bails of the rear sections.

3. A land roller comprising a forward section having draft means secured thereto, rear sections, each section comprising a frame the sides of which are journaled with its roller, and a bail connected to each frame; bracket securing means carried by the sides of the frames, and detachable brackets held in the bracket securing means of the forward section and extending beyond the ends of said section, said brackets adapted to form connections for the bails of the rear sections.

4. A land roller comprising a forward section having draft means attached thereto, rear sections, each section having a frame the sides of which are journaled with its roller, a bail connected to each of the rear frames, bracket securing means carried by the sides of the forward section, and detachable brackets held in the bracket securing means and forming connections for the bails of the rear sections.

5. A land roller comprising a forward section having draft means secured thereto, rear sections, each section comprising a frame the sides of which are journaled with its roller, a bail for the frames of each of the rear sections and having connection with the sides of said frames, bracket securing means carried by the sides of the frames, and detachable brackets held in the bracket securing means of the forward section and forming connections for the bails of the rear sections.

6. A land roller comprising a forward section and rear sections, said sections comprising a roller, a frame having sides forming a journal bearing for the roller, bracket securing means carried by the sides of the frames, bails secured to the frames, and detachable brackets held in said bracket securing means and forming connections for the rear sections.

7. A land roller comprising a forward section and rear sections, each section comprising a roller, each frame supported axially with its roller, and a bail fixedly attached to each frame; and detachable brackets fixedly secured to the ends of the forward section, extending beyond said ends and forming pivotal connections for the bails of the rear sections.

In testimony whereof I have hereunto set my hand in presence of two subscribing witnesses.

LEWIS E. WATERMAN.

Witnesses:
A. O. BEHEL,
E. D. E. N. BEHEL.